United States Patent Office 3,078,272
Patented Feb. 19, 1963

3,078,272
(N,N-AZA-BICYCLO-ALKYLENE-IMINO)-
LOWER ALKYL-GUANIDINES
Robert Paul Mull, Florham Park, N.J., assignor to
Ciba Corporation, a corporation of Delaware
No Drawing. Filed Nov. 10, 1959, Ser. No. 851,970
2 Claims. (Cl. 260—293)

The present invention concerns guanidine compounds. More particularly, it relates to (N,N-bicycloalkylene-imino)-lower alkyl-guanidines, in which the bicycloalkylene portion of the N,N-bicycloalkylene-imino radical contains a total of from five to eleven carbon atoms as ring and bridge members, and in which the guanidino group has the meaning given hereinbelow, salts or quaternary ammonium compounds thereof, as well as process for manufacturing such compounds.

The N,N-bicycloalkylene-imino radical may be represented by the formula:

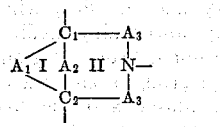

in which $A_1$ represents an alkylene radical, which links the $C_1$-carbon atom with the $C_2$-carbon atom and contains from one to four carbon atoms, $A_2$ represents a direct bond between the $C_1$-carbon atom and the $C_2$-carbon atom or an alkylene radical, which links the $C_1$-carbon atom with the $C_2$-carbon atom and contains from one to two carbon atoms, and $A_3$ represents direct bonds between the imino-nitrogen atom and one of the bridge carbon atoms $C_1$ and $C_2$ or alkylene radicals which link the $C_1$- or the $C_2$-carbon atom with the imino-nitrogen atom and contain from one to two carbon atoms, with the proviso that whenever ring I contains from three to five ring members, ring II contains at least five ring members.

The N,N-bicycloalkylene ring system may be unsubstituted or may contain substituents in addition to the lower alkyl-guanidine group attached to the imino-nitrogen atom; such substituents are primarily lower alkyl, e.g. ethyl, or primarily methyl and the like.

The N,N-bicycloalkylene-imino radical may, therefore, be represented, for example, by the formula:

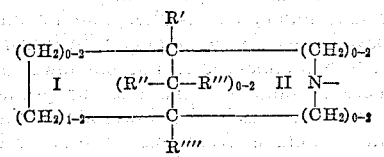

in which each of the radicals R', R", R''' and R'''' stands for hydrogen or methyl, with the proviso that whenever ring I contains from three to five ring members, ring II contains at least five ring members.

N,N-bicycloalkylene-imino radicals may be represented, for example, by 3-aza-3-bicyclo[3,2,0]heptyl, 7-aza-7-bicyclo[4,1,0]heptyl, 2-aza-2-bicyclo[2,2,1]heptyl, 6-aza-6-bicyclo[3,1,1]heptyl, 2-aza-7 bicyclo[2,2,1]heptyl, 3-aza-3-bicyclo[3,3,0]octyl, 2-aza-2-bicyclo[3,2,1]octyl, 3-aza-3-bicyclo[3,2,1]octyl, 1,8,8-trimethyl-3-aza-3-bicyclo[3,2,1]octyl, 7-aza-7-bicyclo[3,2,1]octyl, 2-aza-2-bicyclo[2,2,2]octyl, 2-aza-2-bicyclo[4,3,0]nonyl, 3-aza-3-bicyclo[4,3,0]nonyl, 7-aza-7-bicyclo[4,3,0]nonyl, 8-aza-8-bicyclo[4,3,0]nonyl, 2-aza-2-bicyclo[3,3,1]nonyl, 3-aza-3-bicyclo[3,3,1]nonyl, 2-aza-bicyclo[3,2,2]nonyl, 3-aza-3-bicyclo[3,2,2]nonyl, 7-aza-7-bicyclo[4,4,0]decyl, 8-aza-8-bicyclo[4,4,0]decyl, 10-aza-10-bicyclo[4,3,1]decyl, 8-aza-8-bicyclo[4,3,1]decyl, 2-aza-2-bicyclo[5,4,0]undecyl and the like.

The lower alkyl radical, linking the N,N-bicycloalkylene-imino portion with the guanidino group, is represented by a lower alkylene radical containing from one to seven carbon atoms. Preferably, this radical has from two to three carbon atoms, which separate the N,N-bicycloalkylene-imino portion from the guanidino group by the same number of carbon atoms; 1,2-ethylene, 1-methyl-1,2-ethylene, 2-methyl-1,2-ethylene or 1,3-propylene represent such alkylene radicals. Others are, for example, methylene, 1,1-ethylene, 2,3-butylene, 1,3-butylene, 1,4-butylene, 1,4-pentylene, 1,5-pentylene and the like.

The guanidino group may be represented by the formula:

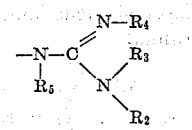

in which each of the radicals $R_2$, $R_3$, $R_4$ and $R_5$ stands primarily for hydrogen. They may also represent an aliphatic hydrocarbon radical, particularly lower alkyl, e.g. methyl, ethyl, n-propyl, isopropyl and the like, with the proviso that at least one of the radicals $R_2$, $R_3$ and $R_4$ stands for hydrogen. One of the radicals $R_2$ and $R_4$ may also be an acyl radical; such acyl radicals may be those of lower aliphatic carboxylic acids, for example, lower alkanoic acids, e.g. acetic, propionic, pivalic acid and the like, substituted lower alkanoic acids, e.g. chloroacetic, dichloroacetic, hydroxyacetic, methoxyacetic, cyclopentylpropionic acid and the like, lower alkenoic acids, e.g. acrylic acid and the like, carbocyclic aryl carboxylic acids, for example, monocyclic carbocyclic aryl carboxylic acids, e.g. benzoic, hydroxybenzoic, 4-methoxybenzoic, 3,4-dimethoxy-benzoic, 3,4,5-trimethoxy-benzoic, 4-O-ethoxycarbonyl-syringic, 3,4-dichlorobenzoic, 3-dimethylamino-benzoic, 4-nitrobenzoic acid and the like, or bicyclic carbocyclic aryl carboxylic acids, e.g. 1-naphthoic, 2-naphthoic acid and the like, or heterocyclic aryl carboxylic acids, for example, monocyclic heterocyclic aryl carboxylic acids, e.g. nicotinic, isonicotinic, 2-furoic acid and the like.

Salts of the new compounds of this invention are particularly therapeutically acceptable, non-toxic acid addition salts, such as those with inorganic acids, for example, mineral acids, e.g. hydrochloric, hydrobromic, sulfuric, phosphoric acids and the like, or those with organic acids, such as organic carboxylic acids, e.g. acetic, propionic, glycolic, lactic, pyruvic, oxalic, malonic, succinic, maleic, fumaric, malic, tartaric, citric, ascorbic, hydroxymaleic, dihydroxymaleic, benzoic, phenyl-acetic, 4-aminobenzoic, 4-hydroxybenzoic, anthranilic, cinnamic, mandelic, salicylic, 4-aminosalicylic, 2-phenoxybenzoic, 2-acetoxybenzoic and the like, or organic sulfonic acids, e.g. methane sulfonic, ethane sulfonic, 2-hydroxyethane sulfonic and the like. Mono- or poly-salts may be formed.

The new guanidine compounds of this invention may also form quaternary ammonium compounds, particularly quaternary ammonium compounds with lower alkyl halides, e.g. methyl, ethyl, propyl or isopropyl chloride, bromide or iodide and the like, with di-lower alkyl sulfates, e.g. dimethyl sulfate, diethyl sulfate and the like, or with lower alkyl lower alkane sulfonates, e.g. methyl or ethyl methane or ethane sulfonate and the like. Also included are the corresponding quaternary ammonium hydroxides and salts, which may be formed from any quaternary ammonium hydroxides by reacting the latter with inorganic acids other than hydrohalic or sulfuric acids, or with organic carboxylic acids, such as those outlined above for the preparation of the acid addition salts.

The new guanidine derivatives of this invention and the salts thereof have antihypertensive properties and can, therefore, be used as antihypertensive agents to relieve hypertensive conditions, particularly those of neurogenic, renal or essential nature. An additional characteristic feature of the guanidine compounds exhibiting antihypertensive effects is the long duration of these properties, which is especially desirable in the treatment of chronic hypertensive states.

A similar antihypertensive effect is shown by (N,N-azabicycloalkylene-imino)-lower alkyl guanidines, in which the bicycloalkylene portion of the N,N-azabicycloalkylene-imino group contains a total of from four to ten carbon atoms as ring and bridge members, the aza-nitrogen atom of the N,N-aza-bycycloalkylene-imino is substituted by $R_1$ to be defined hereinbelow, and the guanidino-lower alkyl portion has the above-given meaning, salts or quaternary ammonium compounds thereof, as well as process for manufacturing such compounds.

The N,N-aza-bicycloalkylene-imino radical is primarily a radical of the formula:

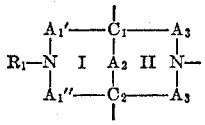

in which $R_1$ has the meaning given hereinbelow, $A_2$ and $A_3$ have the previously-given meaning, each of the symbols $A_1'$ and $A_1''$ represents a direct bond between the $C_1$-carbon atom or the $C_2$-carbon atom and the aza-nitrogen atom carrying the group $R_1$ or an alkylene radical, which connects the $C_1$-carbon atom or the $C_2$-carbon atom with the aza-nitrogen atom carrying the group $R_1$ and contains from one to two carbon atoms, with the proviso that at least one of the symbols $A_1'$ and $A_1''$ represents an alkylene radical containing from one to two carbon atoms, and with the further proviso that whenever ring I contains four ring members, ring II contains at least four ring members.

The carbon atoms of the N,N-aza-bicycloalkylene-imino radical may be unsubstituted or may carry additional substituents, such as, for example, lower alkyl, e.g. ethyl, or particularly methyl, and the like.

The N,N-aza-bicycloalkylene-imino portion may be more especially a group of the formula:

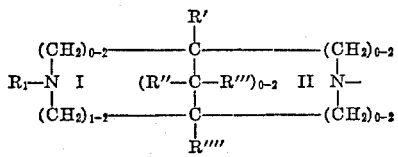

in which each of the radicals $R'$, $R''$, $R'''$ and $R''''$ have the previously-given meaning, and $R_1$ stands for the substituents to be defined hereinbelow, with the proviso, that whenever ring I contains four ring members, ring II contains at least four ring members.

Specific examples of N,N-aza-bicycloalkylene-imino radicals are, for example, 2 - aza - 5 - ($R_1$ - aza) - 2 - bicyclo[2,2,0]hexyl, 3-aza-7-($R_1$-aza)-3-bicyclo[3,3,1]nonyl (or 7-$R_1$-3-bispidinyl) and the like.

The radical $R_1$ represents an aliphatic, a carbocyclic aryl, a carbocyclic aryl aliphatic, a heterocyclic aryl or heterocyclic aryl-aliphatic radical.

An aliphatic radical $R_1$, comprising also a cycloaliphatic radical, is primarily an aliphatic hydrocarbon radical containing from one to ten carbon atoms, such as, for example, alkyl containing from one to ten carbon atoms, especially lower alkyl, e.g. methyl, ethyl, n-propyl, isopropyl, n-butyl, isobutyl, secondary butyl, tertiary butyl, n-pentyl, isopentyl, neopentyl, n-hexyl, isohexyl, n-heptyl and the like, as well as n-octyl, 2,2,3,3,-tetramethyl-butyl, 5,5-dimethyl-hexyl, n-nonyl, n-decyl and the like, lower alkenyl, e.g. ethenyl, 2-propenyl, 2-methyl-2-propenyl, 2-alkenyl, 2-butenyl and the like, lower alkynyl, e.g. ethynyl, 1-propynyl and the like, cycloalkyl containing from three to seven ring carbon atoms, e.g. cyclopropyl, cyclopentyl, cyclohexyl and the like, cycloalkenyl containing from five to seven ring carbon atoms, e.g. cyclohex-3-enyl and the like, cycloalkyl-lower alkyl, in which cycloalkyl contains from three to seven ring carbon atoms and lower alkyl contains from one to four carbon atoms, e.g. 2-cyclohexyl-ethyl, 3-cyclopentyl-propyl and the like, cycloalkenyl-lower alkyl, in which cycloalkenyl contains from five to seven ring carbon atoms and lower alkyl contains from one to four carbon atoms, e.g. 2-(cyclohex-3-enyl)-ethyl, cyclohex-3-enyl-methyl and the like.

Aliphatic radicals may contain substituents; lower alkyl, e.g. methyl, ethyl, n-propyl, isopropyl and the like, may be primarily attached to cycloaliphatic radicals. Functional groups represent substituents of aliphatic or cycloaliphatic radicals whereby one or more than of the same or of different groups may be present; functional groups substitute primarily the above-mentioned lower alkyl radicals.

Functional groups are, for example, oxygen-containing groups, such as, for example, hydroxyl, etherified hydroxyl, such as lower alkoxy, e.g. methoxy, ethoxy, n-propyloxy, isopropyloxy, n-butyloxy, isobutyloxy and the like, polyalkylenedioxy, e.g. polyethylenedioxy, polypropylenedioxy and the like, which may contain from two to twenty lower alkylenedioxy portions and may have a free terminal hydroxyl group or an etherified terminal hydroxyl group, such as a terminal lower alkoxy, e.g. methoxy, ethoxy and the like, group, carbocyclic aryloxy, such as monocyclic carbocyclic aryloxy, e.g. phenyloxy and the like, or carbocyclic aryl-lower alkoxy, such as monocyclic carbocyclic aryl-lower alkoxy, e.g. benzyloxy, diphenyl-methoxy, (4-chlorophenyl)-phenyl-methoxy and the like, or esterified hydroxyl, such as lower alkoxy-carbonyloxy, e.g. methoxy-carbonyloxy, ethoxy-carbonyloxy and the like, carbamyloxy, such as carbamyloxy, N-lower alkyl-carbamyloxy, e.g. N-methyl-carbamyloxy and the like, N,N-di-lower alkyl-carbamyloxy, e.g. N,N-dimethyl-carbamyloxy and the like, or N-carbocyclic aryl-carbamyloxy, particularly N-monocyclic carbocyclic aryl-carbamyloxy, e.g. N-phenyl-carbamyloxy and the like, or lower alkanoyloxy, e.g. acetoxy, propionyloxy and the like, lower alkanoyl, e.g. acetyl, propionyl and the like.

Functional substituents of lower aliphatic, particularly lower alkyl, radicals are also nitrogen-containing groups, such as amino groups, for example, unsubstituted amino or monosubstituted amino, for example, N-lower alkyl-amino, e.g. methylamino, ethylamino and the like, N-carbocyclic aryl-amino, particularly N-monocyclic carbocyclic aryl-amino, e.g. N-phenyl-amino and the like, N-carbocyclic aryl-lower aliphatic hydrocarbon-amino, particularly N-monocyclic carbocyclic-lower alkyl-amino, e.g. N-benzyl-amino and the like, or primarily disubstituted amino, such as N,N-di-lower alkylamino, in which lower alkyl contains from one to four carbon atoms, e.g. N,N-dimethylamino, N-ethyl-N-methylamino, N,N-diethylamino, N,N-di-n-propylamino, N,N-di-isopropyl-amino and the like, N-cycloalkyl-N-lower alkyl-amino, e.g. N - cyclopentyl-N-methyl-amino, N-cyclohexyl-N-methyl-amino and the like, N-carbocyclic aryl-N-lower alkyl-amino, e.g. N-methyl-N-phenyl-amino and the like, N-carbocyclic aryl-lower alkyl-N-lower alkyl-amino, e.g. N-benzyl-N-methyl-amino, N-methyl-N-(2-phenylethyl)-amino and the like, or N,N-alkylene-imino, N,N-oxa-alkylene-imino or N,N-aza-alkylene-imino, in which alkylene contains from four to six carbon atoms as ring members, such as, for example, 1-pyrrolidino radicals, e.g. 1-pyrrolidino, 2-methyl-1-pyrrolidino and the like, 1-piperidino radicals, e.g. 1-piperidino, 2-methyl-1-piperidino, 3-methyl-1-piperidino, 4-methyl-1-piperidino, 3-hydroxy-1-piperidino, 3-acetoxy-1-piperidino, 3-hydroxymethyl-1-piperidino and the like, 1-N,N-hexamethylene-imino, 1-morpholino, or 1-piperazino radicals, e.g. 4-methyl - 1 - piperazino, 4-(2-hydroxyethyl)-1-piperazino, 4-(2-acetoxyethyl)-1-piperazino, 4-(2-polyethylenedioxy-ethyl)-1-piperazino and the like.

Sulfur containing substituents of lower aliphatic radicals are primarily mercapto or etherified mercapto groups; the latter may be represented by lower alkyl-mercapto, e.g. methylmercapto, ethylmercapto and the like, carbocyclic aryl-mercapto, e.g. phenyl-mercapto and the like, or carbocyclic aryl-lower alkyl-mercapto, e.g. benzylmercapto and the like.

Also included as substituents of lower aliphatic, particularly alkyl, radicals are halogen atoms, e.g. fluorine, chlorine or bromine, whereby one or more than one halogen atom may be attached to one or more than one carbon atom of an alkyl radical.

Carbocyclic aryl radicals $R_1$ are primarily monocyclic carbocyclic aryl radicals, e.g. phenyl, or bicyclic carbocyclic aryl radicals, e.g. 1-naphthyl or 2-naphthyl. Such radicals may be unsubstituted or may contain substituents; one or more than one of the same or different substituents may be attached to any of the available carbon atoms. Substituents are, for example, lower alkyl, e.g. methyl, ethyl, n-propyl, isopropyl, n-butyl, tertiary butyl and the like, hydroxyl, etherified hydroxyl, such as lower alkoxy, e.g. methoxy, ethoxy, n-propyloxy, isopropyloxy, n-butoxy and the like, or lower alkylenedioxy, e.g. methylenedioxy, esterified hydroxyl, such as lower alkoxy-carbonyloxy, e.g. methoxy-carbonyloxy, ethoxy-carbonyloxy and the like, or lower alkanoyloxy, e.g. acetyloxy, n-propionyloxy and the like, mercapto, etherified mercapto, particularly lower alkyl-mercapto, e.g. methylmercapto, ethylmercapto and the like, carboxyl, esterified carboxyl, such as carbo-lower alkoxy, e.g. carbomethoxy, carbethoxy and the like, nitro, amino, such as unsubstituted amino, monosubstituted amino, for example, N-lower alkyl-amino, e.g. N-methyl-amino, N-ethylamino and the like, or particularly disubstituted amino, for example, N,N-di-lower alkyl-amino, e.g. N,N-dimethylamino, N,N-diethylamino and the like, halogen, e.g. fluorine, chlorine, bromine and the like, or halogeno-lower alkyl, e.g. trifluoromethyl and the like.

Also included as $R_1$-substituents are carbocyclic aryl-lower aliphatic radicals, primarily monocyclic carbocyclic aryl-lower alkyl, such as phenyl-lower alkyl, e.g. benzyl, diphenyl-methyl, 1-phenyl-ethyl, 2-phenyl-ethyl, 3-phenyl-propyl and the like, bicyclic carbocyclic aryl-lower alkyl radicals, e.g. 1-naphthyl-methyl, 2-naphthyl-methyl and the like, monocyclic carbocyclic aryl-lower alkenyl, e.g. 2-phenylethenyl and the like, or bicyclic carbocyclic aryl-lower alkenyl, e.g. 1-(2-naphthyl)-ethenyl and the like. The carbocyclic portions of these radicals may be unsubstituted or may contain substituents, such as, for example, those mentioned hereinbefore as substituents of the carbocyclic aryl radicals.

Heterocyclic aryl radicals $R_1$ are primarily monocyclic or bicyclic heterocyclic aryl radicals, which contain one or more than one sulfur, oxygen and/or nitrogen atom as ring members, and which are preferably pentacyclic or hexacyclic heterocyclic radicals. Such radicals are represented, for example, by pyridyl, e.g. 2-pyridyl, 3-pyridyl, 4-pyridyl and the like, quinolyl, e.g. 2-quinolyl and the like, pyridazinyl, e.g. 3-pyridazinyl and the like, pyrimidyl, e.g. 2-pyrimidyl, 4-pyrimidyl and the like, pyrazinyl, e.g. 2-pyrazinyl, pyrryl, e.g. 2-pyrryl and the like, thienyl, e.g. 2-thienyl and the like, or furyl, e.g. 2-furyl and the like. $R_1$ may also stand for heterocyclic aryl-lower aliphatic hydrocarbon radicals, such as monocyclic or bicyclic heterocyclic aryl-lower alkyl radicals, particularly pyridyl-lower alkyl, e.g. 2-pyridylmethyl, 3-pyridylmethyl, 4-pyridylmethyl, 2-(4-pyridyl)-ethyl and the like, thienyl-lower alkyl, e.g. 2-thenyl and the like, furyl-lower alkyl, e.g. 2-furyl-methyl and the like, pyridazinyl-lower alkyl, e.g. 4-pyridazinyl-methyl and the like, pyrimidyl-lower alkyl, e.g. 2-pyrimidyl-methyl and the like, pyrazinyl-lower alkyl, e.g. 2-pyrazinylmethyl and the like. The above-described heterocyclic radicals are unsubstituted or may contain as substituents lower alkyl, e.g. methyl, ethyl and the like, lower alkoxy, e.g. methoxy, ethoxy and the like, lower alkyl-mercapto, e.g. methyl-mercapto, ethyl-mercapto and the like, or halogen, e.g. fluorine, chlorine, bromine and the like.

Salts and quaternary ammonium compounds are those with the above-described salt- and quaternary ammonium compound-forming reagents.

The new guanidine compounds of this invention may be prepared by converting in an (N,N-bicycloalkylene-imino)-lower alkyl-amine, in which the N,N-bicycloalkylene-imino group and the lower alkyl radical have the above-given meaning, or in an (N,N-aza-bicycloalkylene-imino)-lower alkyl-amine, in which the N,N-aza-bicycloalkylene-imino group and the lower alkyl radical have the above-given meaning, or a salt thereof, the amino group into a guanidino group and, if desired, converting a resulting salt into the free compound, and/or, if desired, converting a resulting compound into its acyl derivative, and/or, if desired, converting a free compound into a salt or a quaternary ammonium compound thereof.

The reagents of choice for the conversion of an amino group into a guanidino group are S-lower alkyl-isothioureas of the formula:

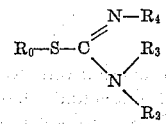

in which $R_2$, $R_3$ and $R_4$ have the previously-given meaning, with the proviso that at least one of the radicals $R_2$, $R_3$ and $R_4$ represents hydrogen, and $R_0$ stands for lower alkyl, e.g. ethyl, n-propyl, isopropyl, or primarily methyl and the like, and acid addition salts thereof. The latter, which are employed in preference over the free base, are primarily those with mineral acids, such as hydrochloric, hydrobromic, or particularly sulfuric acid and the like. The preferred reagents to form a guanidino group is S-methyl-isothiourea and the mineral acid addition salts thereof; S-methyl-isothiourea sulfate is primarily used to form guanidine compounds, which contain an unsubstituted guanidino group. The starting material, in which the amino group is above all an unsubstituted amino group, but may also represent an monosubstituted amino group, such as an N-lower alkyl-amino group, e.g. methylamino, ethylamino and the like, is generally used in the form of the free base.

The reaction is carried out by contacting the starting material with the reagent, preferably in the presence of a solvent, the choice of which depends primarily on the solubility of the reactants. Water or water-miscible organic solvents, such as lower alkanols, e.g. methanol, ethanol, propanol, isopropanol, tertiary butanol and the like, ethers, e.g. diethyleneglycol dimethylether, p-dioxane, tetrahydrofuran and the like, ketones, e.g. acetone, ethyl methyl ketone and the like, lower alkanoic acids, e.g. acetic acid and the like, formamides, e.g. formamide, dimethylformamide and the like, or aqueous mixtures of such diluents may be used as solvents. The reaction may be carried out at room temperature, or, if necessary at an elevated temperature, for example, on the steam bath or at the boiling temperature of the solvent. An absence of oxygen may be achieved by performing the reaction in the atmosphere of an inert gas, e.g. nitrogen, and, if necessary, it may be carried out under pressure in a closed vessel.

Similar reagents capable of converting an amino group into a guanidino group are O-lower alkyl-isoureas of the formula:

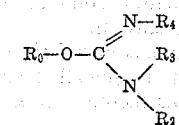

in which $R_2$, $R_3$, $R_4$ and $R_0$ have the previously-given meaning, with the proviso that at least one of the radicals $R_2$, $R_3$ and $R_4$ represents hydrogen, or their salts with mineral acids. These isourea derivatives are used in the same way as the above-described, corresponding isothiourea reagents; O-methyl-isourea sulfate represents a preferred reagent.

The above-described reagents are known, or, if new, may be prepared according to procedures described in the prior art and used for the manufacture of known analogs. For example, the S-lower alkyl-isothioureas or O-lower alkyl-isoureas may be obtained by alkylating thioureas or ureas, in which at least one of the nitrogen atoms carries a hydrogen atom, with a lower alkyl halide, e.g. methyl or ethyl chloride, bromide or iodide and the like, or with a di-lower alkyl-sulfate, e.g. dimethyl sulfate, diethyl sulfate and the like.

Other reagents capable of transforming the amino group of an (N,N-bicycloalkylene-imino)-lower alkyl-amine or of an (N,N-aza-bicycloalkylene-imino)-lower alkyl-amine, particularly of an acid addition salt of such compounds, are cyanamides having the formula:

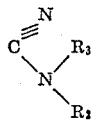

The reaction may be carried out, for example, by heating a mixture of the (N,N-bicycloalkylene-imino)-lower alkyl-amine or the (N,N-aza-bicycloalkylene-imino)-lower alkyl-amine, especially in the form of salts thereof, particularly mineral acid addition salts, such as the hydrochlorides, hydrobromides, sulfates and the like, and the cyanamide. The resulting melt may then be dissolved in a solvent, such as a lower alkanoic acid, e.g. acetic acid, and the like and the desired product may be isolated, for example, by crystallization and the like. The reaction may also be performed in the presence of a solvent, such as a lower alkanol, e.g. ethanol and the like. The salt used as the starting material may also be formed at the site of the reaction by performing the latter in the presence of an acid, particularly a concentrated aqueous mineral acid, e.g. hydrochloric acid and the like. The cyanamide reagent may also be formed in situ; for example, 1-nitroso-3-methyl-guanidine furnishes the N-methyl-cyanamide during the reaction and the latter reacts with the amine to form the desired guanidino compound. The reaction may proceed exothermically, and, if necessary, may be maintained by heating, for example, to from about 80° to about 200°; the atmosphere of an inert gas, e.g. nitrogen may be advantageous.

A third modification of the general procedure for the manufacture of the products of this invention comprises reacting the (N,N-bicycloalkylene-imino)-lower alkyl-amine or the (N,N-aza-bicycloalkylene-imino)-lower alkyl-amine with a salt of a 1-guanyl-pyrazole. A salt of a 1-guanyl-pyrazole is primarily a salt with a mineral acid, such as, for example, nitric acid; the pyrazole nucleus of such reagent may contain additional substituents, particularly lower alkyl, e.g. methyl, ethyl and the like. 1-guanyl-3,5-dimethyl-pyrazole salts, particularly the nitrate thereof, represent the preferred reagents. The reaction may be carried out in the absence of a solvent, for example, by fusing the two reactants, or in the presence of a diluent, such as, for example, a lower alkanol, e.g. ethanol and the like; advantageously, any contact with carbon dioxide is avoided, for example, by performing the reaction in the atmosphere of an inert gas, e.g. nitrogen. The reaction mixture is preferably heated, for example, to the melting point of the mixture or to the boiling point of the solvent.

The (N,N-bicycloalkylene-imino)-lower alkyl-amines or the (N,N - aza - bicycloalkylene-imino)-lower alkyl-amines, and the salts thereof, are known, or, if new, may be prepared according to known procedures. They may, for example, be prepared by treating an N,N-bicycloalkylene-imine or an N,N-aza-bicycloalkylene-imine with a halogeno-lower alkyl-nitrile, in which halogeno represents, for example, chlorine, bromine and the like, or with a lower alkene-nitrile, in which the double bond is activated by the nitrile group in such fashion, that it adds to the secondary amino group, and converting in a resulting (N,N-bicycloalkylene-imino)-lower alkyl-nitrile or (N,N-aza-bicycloalkylene-imino)-lower alkyl-nitrile, the nitrile group to a methylene-amino group by reduction. The latter may be carried out, for example, by catalytic hydrogenation, such as, treatment with hydrogen in the presence of a catalyst containing a metal of the eighth group of the periodic system, e.g. palladium on charcoal or Raney nickel, or, preferably, by treatment with a light metal hydride, for example, an aluminum hydride, such as lithium aluminum hydride, sodium aluminum hydride, magnesium aluminum hydride, aluminum borohydride, aluminum hydride and the like, which hydrides may be used, if desired, in the presence of an activator, such as aluminum chloride.

The compounds of the present invention may also be prepared by converting in an (N,N-bicycloalkylene-imino)-lower alkyl-amine, or in an (N,N-aza-bicycloalkylene-imino)-lower alkylamine, in which the amino group carries a substituent capable of being converted into an amidino group, or a salt thereof, such substituent into an amidino group, and, if desired, carrying out the optional steps.

Depending on the character of the substituent, which is to be converted into an amidino group and is attached to the amino group of the amino compound used as the starting material, the procedure outlined hereinabove may be carried out according to different modifications.

For example, the substituent of the amino group may contain a carbon atom, which is attached to the amino group of the (N,N-bicycloalkylene-imino)-lower alkyl-amine or the (N,N-aza-bicycloalkylene-imino)-lower alkyl-amine; to this carbon atom may be connected a nitrogen atom. Said carbon atom may carry an additional nitrogen atom, as well as other hetero atoms, such as, for example, oxygen or sulfur. Such groups may be, for example, cyano of the formula —C≡N, carbamyl of the formula —CONH—$R_4$, thiocarbamyl of the formula —CSNH—$R_4$, lower alkoxy-(imino)methyl of the formula —C(=NR$_4$)—OR$_0$, in which $R_0$ represents lower alkyl, e.g. ethyl, or primarily methyl and the like, lower alkylmercapto-(imino)methyl of the formula

—C(=NR$_4$)—SR$_0$ in which $R_0$ has the above-given meaning, cyanoamidino of the formula —C(=NR$_4$)—NH—C≡N, guanidino-(imino)methyl of the formula

—C(=NR$_4$)—[NH—C(=NH)—NH$_2$]

isocyano-(iminio)methyl of the formula

—C(=NR$_4$)—N=C=O or isothiocyano-(imino)methyl of the formula

—C(=NR$_4$)—N=C=S and the like, in which $R_4$ has the previously-given meaning, but stands particularly for hydrogen.

Together with the (N,N-bicycloalkylene-imino)-lower alkyl-amino and the (N,N-aza-bicycloalkylene-imino)-lower alkyl-amino portion these substituents form cyanamide, urea, thiourea, O-lower alkyl-isourea, S-lower alkyl-isothiourea, cyanoguanidine, biguanide, cyanourea or cyanothiourea derivatives and the like. All of these compounds have the above-given characteristic, i.e. to the amino group is attached a carbon atom, which carries at least one nitrogen atom, apart from other nitrogen or hetero atoms.

Most of these starting materials may be converted to the desired guanidino derivatives by ammonolysis or aminolysis.

Thus, a cyanamide compound may be converted into a guanidino derivative by treatment with ammonia or an ammonia-furnishing reagent, as well as with an amine, such as an N-lower alkyl-amine. This reaction may be carried out, for example, by treatment of the cyanamide compound with liquid ammonia under pressure and at an elevated temperature, if desired in the presence of an anion capable of combining with a resulting guanidine to form a stable salt; ammonium acetate, ammonium sulfate or ammonium chloride may be used as anion sources. Ammonia may be replaced by ammonia furnishing ammonium salts; such salts are, for example, ammonium monohydrogen phosphate, which may be used under pressure and at an elevated temperature, or ammonium nitrate, whereby a salt, such as, for example, an alkaline earth metal, e.g. calcium and the like, salt or an alkali metal, e.g. sodium, potassium and the like, salt of the cyanamide starting material is preferably used, which may be reacted with the ammonium nitrate in the presence of catalytic amounts of water.

The cyanamide compounds, used as intermediates and having the formulae:

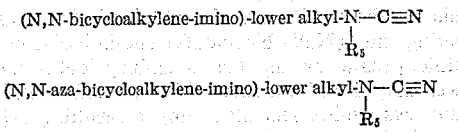

in which $R_5$ stands primarily for hydrogen, but may also be lower alkyl, and salts thereof, may be prepared, for example, by treating an (N,N-bicycloalkylene-imino)-lower alkyl-amine or an (N,N-aza-bicycloalkylene-imino)-lower alkyl-amine with a cyanogen halide, such as cyanogen chloride, cyanogen bromide and the like, advantageously in equivalent amounts and preferably in an inert solvent, such as, for example, ether and the like. As previously shown, these cyanamides may be converted to the guanidino derivatives by ammonolysis or aminolysis.

A carbamyl group attached to the amino group of an (N,N-bicycloalkylene-imino)-lower alkyl-amine or an (N,N-aza-bicycloalkylene-imino)-lower alkyl amine may be converted to the desired amidino group by treatment with ammonia, preferably, in the presence of a dehydrating agent, such as, for example, phosphorous pentoxide. This treatment may be carried out at an elevated temperature in a closed vessel; temperature and pressure may be reduced in the presence of an non-aqueous solvent and/or of a reaction accelerator, such as finely dispersed nickel, aluminum, aluminum oxide and the like. Ammonia may be replaced by an amine, such as an N-lower alkyl-amine, to form a substituted guanidino group.

Furthermore, a thiocarbamyl group, which together with the amino group of an (N,N-bicycloalkylene-imino)-lower alkyl-amine or an (N,N-aza-bicycloalkylene-imino)-lower alkyl-amine forms a thiourea group, may be converted into an amidino group by treatment with ammonia, for example, in the presence of water, and/or of a non-hydrolytic solvent, such as, for example, toluene and the like, and in the presence of a desulfurizing agent, which is advantageously selected from salts, such as basic salts, particularly basic oxides, carbonates and the like, of heavy metals, such as lead, zinc, cadmium, tin, mercury and the like; examples of such basic salts may be, for example, lead oxide, mercuric oxide or lead hydrogen carbonate. Mercuric chloride may also be used. This ammonolysis procedure is preferably carried out at an elevated temperature, and, if necessary, in a closed vessel, primarily to avoid any loss of ammonia. An amine, such as an N-lower alkyl-amine, may replace ammonia, and substituted guanidino derivatives may be formed.

Ureas and thioureas, used as the starting material in the above-mentioned modification of the procedure and having the formulae:

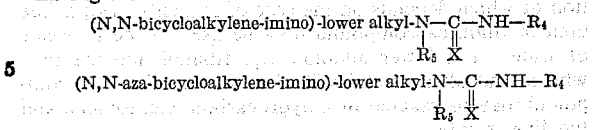

in which $R_4$ and $R_5$ have the previously-given meaning, but represent primarily hydrogen, and X stands for oxygen or sulfur, and salts thereof may be obtained, for example, from (N,N-bicycloalkylene-imino)-lower alkyl-amines or (N,N-aza-bicycloalkylene-imino)-lower alkyl-amines by treatment of the latter with metal cyanates or thiocyanates, particularly alkali metal, e.g. sodium or potassium, cyanates or thiocyanates. These reagents are preferably used in the presence of a solvent, such as, for example, water, if desired, by adding an acid, such as a mineral acid, e.g. hydrochloric, sulfuric acid and the like. This procedure furnishes ureas or thioureas of the above-given formula, in which $R_4$ stands for hydrogen. A lower alkyl isocyanate or a lower alkyl isothiocyanate, when reacted with an (N,N-bicycloalkylene-imino)-lower alkyl-amine or an (N,N-aza-bicycloalkylene-imino)-lower alkyl-amine, yields ureas or thioureas, in which $R_4$ represents lower alkyl. These lower alkyl isocyanates and lower alkyl isothiocyanates are reacted with the amino compound in a solvent, such as, for example, a lower alkanol, e.g. methanol, ethanol and the like.

The above-mentioned urea or thiourea compounds, used as starting materials, may also be obtained by an ammonolysis or aminolysis procedure from reactive functional derivatives of N-(N,N-bicycloalkylene-imino)-lower alkane carbamic acids or N-(N,N-aza-bicycloalkylene-imino)-lower alkane carbamic acids, as well as N-(N,N-bicycloalkylene-imino)-lower alkane thiocarbamic acid or N-(N,N-aza-bicycloalkylene-imino)-lower alkane thiocarbamic acid having the general formulae:

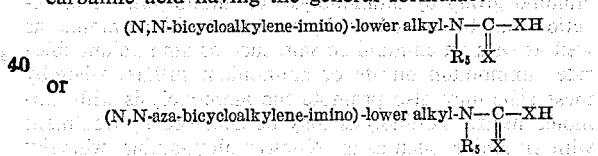

in which $R_5$ and X have the previously-given meaning. Such reactive functional derivatives are primarily esters, for example, lower alkyl, e.g. methyl, ethyl and the like, esters or halides, e.g. chlorides and the like. Upon ammonolysis, for example, by treatment with ammonia, if necessary, at an elevated temperature in a closed vessel, these carbamic and thiocarbamic acids yield the desired urea or thiourea derivatives, respectively. Ammonia may also be replaced by an amine, such as an N-lower alkyl-amine.

The group of O-lower alkyl-isoureas and S-lower alkyl-isothioureas of the formulae:

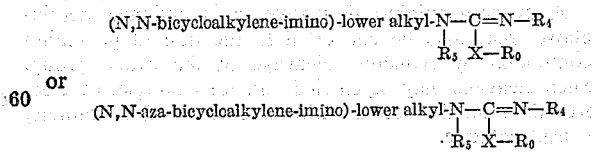

in which $R_4$, $R_5$ and X have the previously-given meaning and $R_0$ stands for lower alkyl, e.g. ethyl, or primarily methyl, and salts thereof, are compounds, which contain the previously-mentioned O-lower alkoxy-(imino)methyl and S-lower alkyl-mercapto-(imino)methyl groups, respectively, attached to the amino group, and are useful intermediates for the preparation of the compounds of this invention. They may be obtained from the previously shown urea and thiourea derivatives by treatment of the latter, or of a metal, such as an alkali metal, e.g. sodium, potassium and the like, salt thereof, with a lower alkyl halide, such as a methyl or ethyl chloride, bromide or iodide and the like, or a di-lower alkyl sulfate, e.g. dimethyl sulfate, diethyl sulfate and the like. Such reaction may be carried out in the presence of a solvent, the selection of which depends on the type of reagents used; a free urea or thiourea compound may be used in the presence of water or a lower alkanol, e.g. ethanol and the like, whereas an alkali metal salt of a urea or thiourea compound may be reacted in a hydrocarbon, e.g. toluene and the like, solution.

These isourea and isothiourea compounds may be converted into the guanidine compounds of this invention. Upon ammonolysis or aminolysis, the O-lower alkoxy-(imino)methyl or S-lower alkyl-mercapto-(imino)methyl portions of the formulae $—C(=NR_4)—OR_0$ and $$—C(=NR_4)—SR_0$$

respectively, in which $R_0$ and $R_4$ have the aforementioned meaning, or the N,(N,N-bicycloalkylene-imino)-lower alkyl-O-lower alkyl-isourea or -S-lower alkyl-isothiourea derivatives, as well as of the N-(N,N-aza-bicycloalkylene-imino)-lower alkyl-O-lower alkyl-isourea or -S-lower alkyl-isothiourea compounds, are converted into amidino groups. Ammonolysis may be carried out by treatment with ammonia, either in its liquid form or as an aqueous solution, whereby an elevated temperature and/or a closed vessel, as well as the presence of an ammonium salt, such as ammonium chloride, may be required. If necessary, dehydrating agents or desulfurizing agents, such as those described hereinbefore, may be present in the reaction medium, depending on the starting material. An amine, such as an N-lower alkyl-amine, may also be used for the conversion of the isourea and isothioureas into guanidine derivatives containing a substituted guanidino group.

A cyanamidino group, which forms a cyanoguanidino group with the amino group of an (N,N-bicycloalkylene-imino)-lower alkyl-amine or of an (N,N-bicycloalkylene-imino)-lower alkyl-amine, may be converted into an amidino group by ammonolysis or aminolysis. This reaction may be carried out by treatment with ammonia, as well as with an ammonium salt, such as ammonium chloride, ammonium nitrate or ammonium sulfate, whereby these salts may also promote the ammonolysis with ammonia itself. Aminolysis may be achieved by treatment with an amine, such as an N-lower alkyl-amine, whereby substituted guanidino groups are formed.

In the ammonolysis procedure of a cyanoguanidino to a guanidino derivative as described hereinabove, a biguanido group may be formed intermediarily, which, upon further treatment with the ammonolysis reagent, may be converted to the desired guanidino group. Such biguanido derivatives may be accessible through different procedures (as will be shown hereinbelow) and may, therefore, also be used as a starting material for the formation of the desired guanidino compounds by treatment with one of the ammonolysis or aminolysis reagents described hereinbefore.

A cyano-guanidino derivative, as mentioned hereinabove, may also be converted to the desired guanidino compound by reductive cleavage of the cyano group. Such cleavage may be carried out, for example, by electrolytic reduction on a cathode, such as, for example, a lead cathode.

The cyanoguanidino derivatives of the formulae:

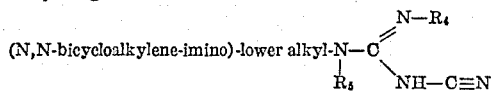

or

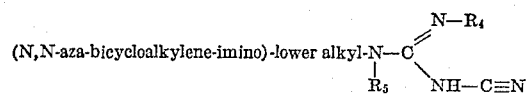

in which $R_4$ and $R_5$ have the previously-given meaning, and their salts, which compounds may be converted to the desired guanidino groups by ammonolysis, aminolysis or reduction as shown above, may be prepared by treatment of S-lower alkyl-cyano-isothioureas of the formulae:

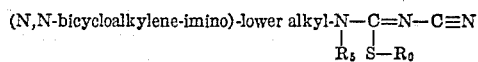

or

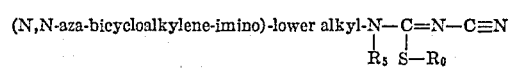

in which $R_5$ and $R_0$ have the previously-given meaning, with ammonia in a lower alkanol, e.g. ethanol and the like, preferably in a sealed tube, or with an amine, such as an N-lower alkyl-amine.

The S-lower alkyl-cyanoisothiourea derivatives of the above formula, which are used as intermediates for the preparation of cyano-guanidine compounds, may, therefore, also serve as starting materials in the process for the preparation of the guanidino compounds of this invention, inasmuch as ammonolysis or aminolysis thereof may yield directly the desired guanidino derivatives, if the treatment with ammonia is carried out, for example, in the presence of anions of strong acids, such as halide, nitrate or sulfate ions, furnished, for example, by the respective ammonium salts.

The S-lower alkyl-cyanoisothioureas of the above formula or their salts may be obtained, for example, by treating an (N,N - bicycloalkylene-imino)-lower alkyl-isothiocyanate or an (N,N-aza-bicycloalkylene-imino)-lower alkyl-isothiocyanate with an alkali metal, e.g. sodium, cyanamide and alkylating a resulting 1-[(N,N-bicycloalkylene-imino)-lower alkyl]-3-cyano-2-thiourea or a 1 - [(N,N-aza-bicycloalkylene-imino) - lower alkyl]-3-cyano-2-thiourea, preferably a salt thereof, with a lower alkyl halide, e.g. methyl or ethyl chloride, bromide or iodide and the like, or with a di-lower alkyl sulfate, e.g. dimethyl sulfate, diethyl sulfate and the like, as shown hereinbefore for the preparation of the S-lower alkyl-isothioureas used as starting materials for the preparation of the desired guanidines.

As has been shown, the ammonolysis of cyano-guanidines may give rise to the formation of biguanido compounds of the formulae:

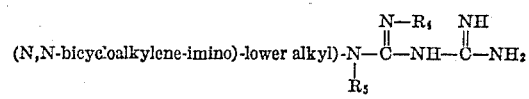

or

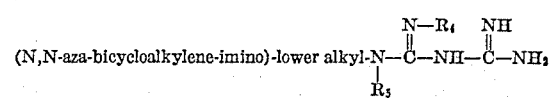

in which $R_4$ and $R_5$ have the previously-given meaning, and salts thereof. These compounds may also be prepared, for example, by reacting an (N,N-bicycloalkylene-imino)-lower alkyl-amine or an (N,N-aza-bicycloalkylene-imino)-lower alkyl-amine with a dicyanodiamide, preferably in the presence of a complex metal-forming salt, such as copper sulfate. A resulting biguanido complex metal salt, such as the copper complex salt thereof, may be liberated to form the free compound by treatment with an acid, such as a mineral acid, e.g. sulfuric acid and the like.

As mentioned hereinbefore, the ammonolysis with ammonia or ammonia-furnishing reagents may be replaced by aminolysis with amines, particularly N-lower alkyl-amines, e.g. methylamine, ethylamine and the like; such aminolysis reactions furnish the substituted guanidino groups mentioned hereinabove.

In addition to ammonolysis and aminolysis, the guanidino compounds may also be obtained by hydrolysis of an (N,N-bicycloalkylene-imino)-lower alkyl-amine or an (N,N-aza-bicycloalkylene-imino)-lower alkyl-amine, in which the amino group carries a substituent, which can be hydrolyzed to an amidino group. Such substituent may form together with the amino group of the (N,N- bicycloalkylene-imino)-lower alkyl-amine or the (N,N-aza-bicycloalkylene-imino)-lower alkyl-amine a cyano-urea or a cyanothiourea group of the formulae $$-C(=NR_4)-N=C=O$$

and $-C(=NR_4)-N=C=S$, respectively, in which $R_4$ has the previously-given meaning, but stands primarily for hydrogen. Compounds containing such groups yield upon treatment with a hydrolytic reagent, particularly a dilute mineral acid, such as aqueous sulfuric acid, the desired guanidino compounds. In such hydrolysis reaction, the desired guanidine derivative may be formed simultaneously with a biuret derivative as the by-product.

Cyanourea or cyanothiourea compounds of the formulae:

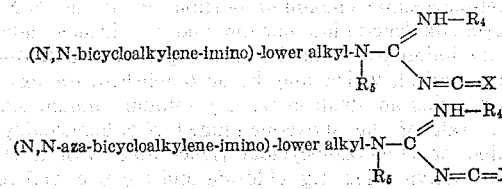

in which $R_4$ and $R_5$ have the above-given meaning, and X represents oxygen or sulfur, and salts thereof, which may be converted to the desired guanidino compounds by hydrolysis, may be obtained, for example, by reacting an (N,N-bicycloalkylene-imino)-lower alkyl-cyanamide or an (N,N-aza-bicycloalkylene-imino)-lower alkyl-cyanamide with a metal cyanate or thiocyanate, particularly an alkali metal, e.g. sodium or potassium, cyanate or thiocyanate in a neutral medium, for example, in the presence of water.

Apart from (N,N-bicycloalkylene-imino)-lower alkyl-amines or (N,N-aza-bicycloalkylene-imino)-lower alkyl-amines, in which the amino group is substituted by a carbon atom carrying a nitrogen atom, other (N,N-bicycloalkylene-imino)-lower alkyl-amines or (N,N-aza-bicycloalkylene-imino)-lower alkyl-amines, in which the amino group carries a substituent convertible into an amidino group, may be useful for the conversion into the desired (N,N-bicycloalkylene-imino)-lower alkyl-guanidines or (N,N-aza-bicycloalkylene-imino)-lower alkyl-guanidines. In such a conversion intermediates may be formed, which may have the previously-given characteristics, i.e. the amino group carries a carbon with a nitrogen atom attached thereto. Such groups are, for example, ester groups, formed by a carboxyl, a thionocarboxyl, a thiolocarboxyl or a dithiocarboxy group with a lower alkanol, as well as halogeno-carbonyl or halogeno-thionocarbonyl groups, in which halogen represents primarily chlorine.

Such derivatives are, for example, the reactive functional derivatives of carbamic acids and thiocarbamic acids, having the formulae:

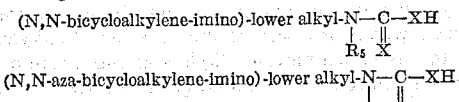

in which $R_5$ has the previously-given meaning, and X represents oxygen or sulfur. As shown hereinabove, esters, for example, lower alkyl, e.g. methyl, ethyl and the like, esters or halides, e.g. chlorides, of such acids yield upon ammonolysis the corresponding urea and thiourea derivatives. However, if, for example, the ammonolysis of a carbamic acid ester is carried out in the presence of a dehydrating agent, such as, for example, previously shown in the conversion of urea derivatives to guanidines, an N-(N,N-bicycloalkylene-imino)-lower alkyl-carbamic acid ester or an N-(N,N-aza-bicycloalkylene-imino)-lower alkyl-carbamic acid ester may be converted directly to the desired guanidino compound. Or, an ester of an N-(N,N-bicycloalkylene-imino)-lower alkyl-thiocarbamic acid or of an N-(N,N-aza-bicycloalkylene-imino)-lower alkyl-thiocarbamic acid may be subjected to ammonolysis to yield directly the desired guanidino compound, for example, in the presence of a desulfurizing reagent, such as one of those previously shown in the conversion of a thiourea derivative into the desired guanidino compounds, e.g. lead oxide and the like.

The carbamic and thiocarbamic acid derivatives used as the starting materials may be prepared according to procedures used for the manufacture of known analogs. For example, upon treatment of an (N,N-bicycloalkylene-imino)-lower alkyl-amine or an (N,N-aza-bicycloalkylene-imino)-lower alkyl-amine with phosgene or thiophosgene, which reagents may be used in a slight excess over the amines, the (N,N-bicycloalkylene-imino)-lower alkyl - isocyanates, (N,N - bicycloalkylene-imino)-lower alkyl-isothiocyanates, (N,N - aza-bicycloalkylene-imino)-lower alkyl-isocyanates, and (N,N-aza-bicycloalkylene-imino)-lower alkyl-isothiocyanates, respectively, may be formed. These cyanate and isothiocyanate compounds may be converted into esters of carbamic or thiocarbamic acids by treatment with an alcohol, for example, lower alkanols, e.g. methanol, ethanol and the like, or into the corresponding thiolesters, by treatment with mercaptans, such as lower alkylmercaptans, e.g. methylmercaptan, ethylmercaptan and the like. They may also be obtained by reacting an (N,N-bicycloalkylene-imino)-lower alkyl-amine or an (N,N - aza - bicycloalkylene - imino)-lower alkyl-amine with a carbonic acid lower alkyl ester, or, particularly, a dithiocarbonic acid lower alkyl ester, as well as with a lower alkyl ester of a halogeno-formic acid, such as chloroformic acid, or, primarily, of a halogeno-thioformic acid, such as chloro-thioformic acid.

Or, a salt of an (N,N-bicycloalkylene-imino)-lower alkyl amine or an (N,N-aza-bicycloalkylene-imino)-lower alkylamine, particularly a hydrohalide, e.g. hydrochloride, thereof, when reacted with phosgene or thiophosgene at an elevated temperature, preferably in a closed vessel, yields the desired N-(N,N-bicycloalkylene-imino)-lower alkyl-carbamic acid chloride, N-(N,N-bicycloalkylene-imino)-lower alkyl-thiocarbamic acid chloride, N-(N,N-aza-bicycloalkylene-imino)-lower alkyl-carbamic acid chloride and N-(N,N-aza-bicycloalkylene-imino)-lower alkyl-thiocarbamic acid chloride, respectively.

The (N,N-bicycloalkylene-imino)-lower alkyl-amines or (N,N-aza-bicycloalkylene-imino)-lower alkyl-amines, which are used in many of the above instances to manufacture the starting materials in the procedure of the invention, are known or if new may be prepared, for example, according to the previously-shown procedure.

A further procedure to prepare the compounds of this invention comprises converting in (N,N-bicycloalkylene-imino)-lower alkane carboxylic acid guanides, guanidino-lower alkane carboxylic acid N,N-bicycloalkylene-imides, (N,N-aza-bicycloalkylene-imino)-lower alkane carboxylic acid guanides or guanidino-lower alkane carboxylic acid N,N-aza-bicycloalkylene-imides, the carbonyl group of the amide portion to a methylene group, and, if desired, carrying out the optional steps.

The reduction of the carbonyl portion of the amide groups may be carried out, for example, by treatment with an aluminum hydride, particularly an alkali metal aluminum hydride, e.g. lithium aluminum hydride, sodium aluminum hydride and the like, or an alkaline earth metal aluminum hydride, e.g. magnesium aluminum hydride and the like, or aluminum hydride. If necessary, activators such as, for example, aluminum chloride, may be used together with the hydride reducing reagent. The reduction with these reagents is preferably performed in the presence of a solvent, particularly an ether, such as a di-lower alkyl ether, e.g. diethyl ether, dipropyl ether and the like, or a cyclic ether, e.g. tetrahydrofurane and the like, and, if desired, at an elevated temperature and/or in the atmosphere of an inert gas, e.g. nitrogen.

The desired conversion may also be carried out by electrolytically reducing the amide derivative on a cathode of a high overpotential such as a cadmium, zinc, mercury, lead amalgam or lead. The catholyte used in such a reduction is preferably a mixture of water, sulfuric acid and a lower alkanoic acid, e.g. acetic, propionic acid and the like. A platinum, carbon, lead or stainless steel anode may be used; the anolyte is preferably sulfuric acid.

The starting materials used in the above reduction procedure may be prepared, for example, by treating a reactive functional derivative of an (N,N-bicycloalkylene-imino)-lower alkane carboxylic acid or of an (N,N-aza-bicycloalkylene-imino)-lower alkane carboxylic acid with a guanidine or a reactive functional derivative of a guanidino-lower alkane carboxylic acid with an N,N-bicycloalkylene-imine or an N,N-aza-bicycloalkylene-imine, respectively, to form the desired amide compounds. Reactive functional derivatives of carboxylic acids are, for example, esters, such as lower alkyl, e.g. methyl, ethyl and the like, esters or activated esters, which are particularly useful for the formation of amide bonds, such as esters with reactive mercaptan compounds, e.g. mercaptoacetic acid and the like, or with reactive hydroxyl compounds, e.g. hydroxy-acetonitrile and the like. Such esters may be prepared according to procedures which are known for the manufacture of analogous esters. Other reactive functional derivatives of acids are the acid addition salts of acid halides, particularly the hydrochloride of an acid chloride, which may be prepared according to standard methods.

The reaction of these reactive functional derivatives of carboxylic acids with the amino compounds may be carried out, for example, by treating a salt of an acid halide, particularly the hydrochloride of an acid chloride with the amine, preferably in a polar, but non-hydroxylated solvent, such as, for example, dimethylformamide, diethyleneglycol dimethylether, p-dioxane, tetrahydrofuran and the like.

A modification of the above procedure comprises converting in (N,N-bicycloalkylene-imino)-lower alkane thiocarboxylic acid guanides, (N,N-aza-bicycloalkylene-imino)-lower alkane thiocarboxylic acid guanides, guanidino-lower alkane thiocarboxylic acid N,N-bicycloalkylene-imides or guanidino-lower alkane thiocarboxylic acid N,N-aza-bicycloalkylene-imides, the thiocarbonyl group of the thioamide portion into a methylene group, and, if desired, carrying out the optional steps.

The replacement of the sulfur in the above-mentioned thioamides may be carried out by desulfurization, for example, with a freshly prepared hydrogenation catalyst, such as Raney nickel, in an alcoholic solvent, e.g. methanol, ethanol and the like, if desired, in the presence of hydrogen, or electrolytically according to the procedure outlined hereinabove for the reduction of the amides.

The thioamides used as the starting materials in this modification may be prepared from the corresponding, previously-described amides, for example, by treatment with phosphorus trisulfide, phosphorus pentasulfide and the like. A modification may consist in electrolytically reducing the amide in the presence of an alkali metal sulfide, e.g. sodium sulfide and the like, thereby forming the thioamide as an non-isolated intermediate.

Another method of preparing the above-described guanidino compounds comprises replacing in (N,N-bicycloalkylene-imino)-lower alkyl-guanidines or (N,N-aza-bicycloalkylene-imino)-lower alkyl-guanidines, in which one of the carbon atoms which are part of the N,N-bicycloalkylene-imino portion or of the N,N-aza-bicycloalkylene-imino portion and are located adjacent to the imino group, carries a doubly bound oxygen or sulfur atom, i.e. an oxo group of the formula =O or a thiono group of the formula =S, such oxygen or sulfur atom by two hydrogen atoms, and, if desired, carrying out the optional steps.

The above-mentioned oxo and thiono groups form together with the imino nitrogen atom of the N,N-bicycloalkylene-imino or the N,N-aza-bicycloalkylene-imino portions an amide or a thioamide group. Such groups may be converted into the desired methyleneimino group by previously-described procedures; for example, an oxo group of an amide grouping may be replaced by two hydrogen atoms by treatment with an aluminum hydride, such as lithium aluminum hydride, or a thiono group of a thioamide grouping may be exchanged for two hydrogen atoms by desulfurization with a freshly prepared hydrogenation catalyst, such as Raney nickel. These reactions are carried out as previously shown.

The starting material used in this modification may be prepared, for example, by introducing into an N,N-bicycloalkylene-imine or an N,N-aza-bicycloalkylene-imino, in which one of the carbon atoms, which are part of the N,N-bicycloalkylene-imino portion or of the N,N-aza-bicycloalkylene-imino portion and are located adjacent to the imino group, carries an oxo group, an amino-lower alkyl radical, which may be accomplished, for example, by reacting an alkali metal, e.g. lithium, sodium and the like, salt of the above-mentioned N,N-bicycloalkylene-imine or N,N-aza-bicycloalkylene-imine with a cyano-lower alkyl-halide, e.g. chloride and the like, and reducing in a resulting (N,N-bicycloalkylene-imino)-lower alkanoyl-nitrile or an (N,N-aza-bicycloalkylene-imino)-lower alkanoyl-nitrile, in which one of the carbon atoms, which are part of the N,N-bicycloalkylene-imino portion or of the N,N-aza-bicycloalkylene-imino portion and are located adjacent to the imino group, carries an oxo group, the nitrile group to a methyleneamino group, which may be accomplished, for example, by treatment with a hydride reducing agent, such as an alkali metal aluminum hydride, e.g. lithium aluminum hydride and the like. An N,N-bicycloalkylene-imine or an N,N-aza-bicycloalkylene-imine, in which one of the carbon atoms, which are part of the N,N-bicycloalkylene-imino portion or of the N,N-aza-bicycloalkylene-imino portion and are located adjacent to the imino group, carries an oxo group, may also be reacted with a lower alkenoyl nitrile, e.g. acrylonitrile and the like, to yield the corresponding (N,N-bicycloalkylene-imino)-lower alkanoyl-nitrile or (N,N-aza-bicycloalkylene - imino)-lower alkanoyl-nitrile, which is then reduced to the desired amino compound as shown hereinabove. The thus obtained (N,N-bicycloalkylene-imino)-lower alkyl-amine or the (N,N-aza-bicycloalkylene-imino)-lower alkyl-amine, in which one of the carbon atoms, which are part of the N,N-bicycloalkylene-imino or the N,N-aza-bicycloalkylene-imino portion and are located adjacent to the imino group, carries an oxo group, may then be converted to the corresponding guanidine derivatives, for example, by treatment with a salt of an S-lower alkyl-isothiourea, such as the S-methyl-isothiourea sulfate.

A resulting (N,N-bicycloalkylene-imino)-lower alkyl-guanidine or (N,N-aza-bicycloalkylene-imino) - lower alkyl-guanidine compound, in which one of the carbon atoms, which are part of the N,N-bicycloalkylene-imino or the N,N-aza-bicyclo-alkylene-imino portion and are located adjacent to the imino group, carries an oxo group, compound may be converted to the (N,N-bicycloalkylene-imino)-lower alkyl-guanidine or the (N,N-aza-bicycloalkylene-imino)-lower alkyl-guanidine, in which one of the carbon atoms, which are part of the N,N-bicycloalkylene-imino or the N,N-aza-bicycloalkylene-imino portion and are located adjacent to the imino group, carries a thiono group, for example, by treatment with phosphorus trisulfide, phosphorus pentasulfide and the like, as shown hereinbefore.

Instead of only one carbon atom of the N,N-bicycloalkylene-imino or N,N-aza-bicycloalkylene-imino portion carrying an oxo or a thiono group, both carbon atoms adjacent to the imino-nitrogen atom in the respective bicycloalkylene radicals may contain oxo or thiono groups; these groups may be removed as previously shown, for example, by reduction, desulfurization, etc.

Furthermore, a carbonyl or a thiocarbonyl may also be adjacent to the aza-nitrogen atom in an N,N-aza-bicycloalkylene-imino portion of an (N,N-aza-bicycloalkylene-imino)-lower alkyl-guanidine; such groups may be removed according to the previously shown procedures, e.g. reduction, desulfurization and the like, to form the desired (N,N-aza-bicycloalkylene-imino)-lower alkyl-guanidine compounds. The intermediates used in the foregoing procedure are prepared, for example, according to the procedure used for the preparation of the aforementioned (N,N-aza-bicycloalkylene-imino) - lower alkyl-guanidines, in which one of the carbon atoms of the N,N-aza-bicycloalkylene-imino portion, which are located adjacent to the imino group, contains an oxo group by using the appropriate starting materials.

A combination of the above-shown modifications may also be visualized. For example, upon treatment of an (N,N-bicyclo-alkylene-imino)-lower alkane carboxylic acid guanide, an (N,N-aza-bicycloalkylene-imino)-lower alkane carboxylic acid guanide, a guanidino-lower alkane carboxylic acid N,N-bicycloalkylene-imide or of a guanidino-lower alkane carboxylic acid N,N-aza-bicycloalkylene-imide, in which compounds one of the carbon atoms, which are part of the N,N-bicycloalkylene-imino or the N,N-aza-bicycloalkylene-imino portion and are located adjacent to the imino group, carries an oxo group, with one of the reduction reagents previously-described, the desired (N,N-bicycloalkylene-imino)-lower alkyl-guanidines or (N,N-aza-bicycloalkylene-imino)-lower alkyl-guanidines can be formed. The starting materials used in such a procedure may be prepared along the previously-outlined procedures by selecting the appropriate intermediates.

Likewise, (N,N-bicycloalkylene-imino)-lower alkane thiocarboxylic acid guanides, (N,N-aza-bicycloalkylene-imino)-lower alkane thiocarboxylic acid guanides, guanidino-lower alkane thiocarboxylic acid N,N-bicycloalkylene-imides or guanidino-lower alkane thiocarboxylic acid N,N-aza-bicycloalkylene-imides, in which compounds one of the carbon atoms, which are part of the N,N-bicycloalkylene-imino or the N,N-aza-bicycloalkylene-imino portion and are located adjacent to the imino group, carries a thiono group, may be converted to the desired (N,N-bicycloalkylene-imino)-lower alkyl-guanidines or (N,N-aza-bicycloalkylene-imino)-lower alkyl-guanidines, for example, by desulfurization as outlined hereinabove. The above starting materials may be prepared according to the previously-outlined procedures by selecting the appropriate intermediates.

In the products obtained according to the above-described methods, additional groups may be introduced or groups may be exchanged for other substituents. For example, resulting guanidines, such as, for example, those of the formulae:

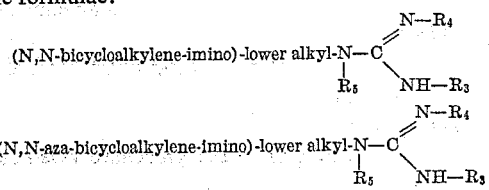

may be acylated to form compounds of the formulae:

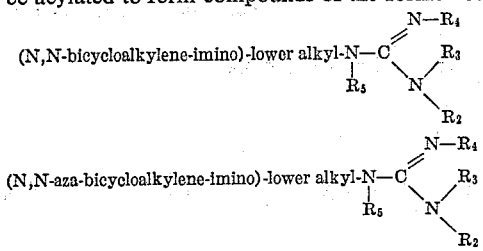

in which formulae $R_3$, $R_4$ and $R_5$ have the previously-given meaning and $R_2$ represents an acyl radical. Such reaction may be carried out, for example, by treating the guanidine compound with the reactive derivative of a carboxylic acid, for example, with the halide, e.g. chloride and the like, or the anhydride of a carboxylic acid. It may be performed in the presence of an inert solvent, for example, in a hydrocarbon, such as a lower alkane, e.g. hexane and the like, or a monocyclic carbocyclic aryl hydrocarbon, e.g. benzene, toluene, xylene and the like, or in a tertiary organic base, such as a liquid pyridine compound, e.g. pyridine, collidine and the like. Acylation may also be achieved in the absence of a solvent, for example, by heating the guanidine compound or a salt thereof with the acylating reagent, for example, acetic acid anhydride in a sealed tube.

The new guanidine compounds may be obtained in the form of the free compounds or as the salts thereof. A salt may be converted into the free compound in the customary way, for example, by treatment with a strong alkaline reagent, such as aqueous alkali metal hydroxide, e.g. lithium, sodium, potassium hydroxide and the like, or a strong quaternary ammonium anion (hydroxy ion) exchange resin and the like. A free base may be transformed into its therapeutically useful acid addition salts by reacting the latter with an appropriate inorganic or organic acid, such as one of the above-mentioned acids. The reaction may be carried out, for example, in a solvent, such as, for example, a lower alkanol, e.g. methanol, ethanol, propanol, isopropanol and the like, an ether, e.g. diethylether, p-dioxane and the like, a lower alkyl lower alkanoate, e.g. ethyl acetate and the like, a halogenated hydrocarbon, e.g. methylene chloride and the like, or a mixture of such solvents, and isolating the desired salt. Mono- or poly-salts may be formed.

The new guanidine compounds of this invention may also form quaternary ammonium compounds, particularly those with lower alkyl halides, e.g. methyl, ethyl, n-propyl or isopropyl chloride bromide or iodide and the like, with di-lower alkyl-sulfates, e.g. dimethyl sulfate, diethyl sulfate and the like, or with lower alkyl lower alkane sulfonates, e.g. methyl or ethyl methane or ethane sulfonate, and the like, as well as the corresponding quaternary ammonium hydroxides and the salts which may be formed from the quaternary ammonium hydroxides by the reaction with inorganic acids other than the hydrohalic acids or with organic acids, such as those outlined above for the preparation of the acid addition salts.

The quaternary ammonium compounds may be obtained by reacting a resulting free base with a lower alkyl halide, e.g. methyl, ethyl, n-propyl, isopropyl chloride, bromide or iodide and the like, with a di-lower alkyl-sulfate, e.g. dimethyl sulfate, diethyl sulfate and the like, or with a lower alkyl lower alkane sulfonate, e.g. methyl or ethyl methane or ethane sulfonate and the like. The quaternizing reaction may be performed in the absence or in the presence of a solvent, such as, for example, a lower alkanol, e.g. methanol, ethanol, propanol, isopropanol, tertiary butanol and the like, a lower alkanone, e.g. acetone, ethyl methyl ketone and the like, an organic acid amide, e.g. formamide, dimethylformamide and the like or a halogenated hydrocarbon, e.g. methylene chloride and the like. Resulting quaternary ammonium compounds may be converted into the corresponding quaternary ammonium hydroxides, for example, by reacting resulting quaternary ammonium halides with silver oxide, by treating quaternary ammonium sulfates with barium hydroxide, or quaternary ammonium salts with an anion exchanger, or by electrodialysis. From a resulting quaternary ammonium hydroxide there may be formed therapeutically suitable quaternary ammonium salts by treating the quaternary ammonium hydroxide with acids, for example, with those outlined hereinbefore as being useful for the preparation of acid addition salts.

The invention also comprises any modification of the general process, wherein a compound obtainable as an intermediate at any stage of the process is used as the starting material and the remaining step(s) of the process is(are) carried out; also included within the scope of the invention are any new intermediates.

In the process of this invention such starting materials are preferably used which lead to final products mentioned in the beginning as preferred embodiments of the invention.

The following examples illustrate the invention and are not to be construed as being limitations thereon. Temperatures are given in degrees centigrade.

Example 1

To 3 g. of 2-(3-aza-3-bicyclo[3,3,1]nonyl)-ethylamine in 5 ml. of water is added 2.5 g. of S-methyl-isothiourea sulfate, and the solution is refluxed until methyl mercaptan is no longer evolved. The reaction mixture is concentrated under reduced pressure and the residue is recrystallized from a mixture of ethanol and water to yield the desired 2-(3-aza-3-bicyclo[3,3,1]nonyl)-ethyl-guanidine sulfate.

The starting material may be prepared as follows: 10.0 g. of 3-aza-bicyclo[3,3,1]nonane in 50 ml. of benzene is added with stirring to a solution of 6.0 g. of chloroacetonitrile in 50 ml. of benzene, in which 4.25 g. of anhydrous sodium carbonate is suspended. After refluxing for four hours, the mixture is filtered, the filtrate is concentrated and the residue distilled under reduced pressure to yield the desired 3-aza-3-bicyclo[3,3,1]nonyl-acetonitrile.

8.2 g. of the 3-aza-3-bicyclo[3,3,1]nonyl-acetonitrile is carefully added to a solution, containing 2.65 g. of lithium aluminum hydride in 700 ml. of anhydrous ether. The reaction mixture is refluxed for four hours and stirred overnight. 3 ml. of water, 3 ml. of a 20 percent aqueous sodium hydroxide solution and 11 ml. of water are added in succession to the cold mixture, which is then filtered. The aqueous layer is separated; the ether phase is dried, the solvent is evaporated, and the oily 2-(3-aza-3-bicyclo[3,3,1]nonyl)-ethylamine is purified by distillation under reduced pressure.

Example 2

To 5 g. of 3-(7-aza-7-bicyclo[4,1,0]heptyl)-propylamine in 5 ml. of water is added 4.5 g. of S-methyl-isothiourea sulfate. The mixture is refluxed until the evolution of methyl mercaptan ceases and is then concentrated to dryness under reduced pressure. The residue is recrystallized from methanol to give the desired 3-(7-aza-7-bicyclo[4,1,0]heptyl)-propyl-guanidine sulfate.

Example 3

To a mixture of 5 g. of 2-(3-aza-3-bicyclo[3,3,0]octyl)-ethylamine in 5 ml. of water is added 4.5 g. of S-methyl-isothiourea sulfate. The mixture is refluxed until methyl mercaptan is no longer evolved and is then concentrated to dryness under reduced pressure. The residue, representing the 2-(3-aza-3-[3,3,0]octyl)-ethyl-guanidine sulfate, is recrystallized from ethanol.

The starting material may be prepared as follows: 28.0 g. of 1,2-cis-cyclopentane dicarboxylic acid anhydride and 6.0 g. of ethylenediamine and mixed while stirring and then heated until water is no longer evolved. The desired 2-(3-aza-2,4-dioxo-3-bicyclo[3,3,0]octyl)-ethylamine is obtained by distillation under reduced pressure.

To a mixture of 13 g. of lithium aluminum hydride in 100 ml. of dry ether is added 18.2 g. of 2-(3-aza-2,4-dioxo-3-bicyclo[3,3,0]octyl)-ethylamine. After refluxing for five hours and stirring overnight, the reaction mixture is decomposed by adding 15 ml. of water, 10 ml. of a 20 percent aqueous sodium hydroxide solution and 45 ml. of water. After filtering and separating the aqueous phase, the organic layer is dried and evaporated, and the residue is distilled under reduced pressure to yield the desired 2-(3-aza-3-bicyclo[3,3,0]octyl)-ethylamine.

Example 4

18.3 g. of 2-{3-aza-7-(methyl-aza)-3-bicyclo[3,3,1]nonyl}-ethylamine and 1.39 g. of S-methyl-isothiourea sulfate are mixed with 5 ml. of water. The mixture is refluxed until the evolution of methylmercaptan ceases and is then concentrated under reduced pressure. The residue is recrystallized from a mixture of ethanol and water to yield the desired 2-{3-aza-7-(methyl-aza)-3-bicyclo[3,3,1]nonyl}-ethyl-guanidine sulfate (or 2-[7-methyl-3-bispidinyl]-ethyl-guanidine sulfate).

The starting material can be prepared as follows: 15.0 g. of methyl formate is added in one portion to 21.0 g. of 3,7-diaza-bicyclo[3,3,1]nonane (bispidin) in a flask equipped with a reflux condenser. The temperature rises to 85° and is maintained there by applying external heat for five hours. The mixture is concentrated under reduced pressure and then fractionated to yield the 3-aza-7-(formyl-aza)-bicyclo[3,3,1]nonane (or N-formyl-bispidin).

A solution of 15.4 g. of 3-aza-7-(formyl-aza)-bicyclo[3,3,1]nonane in tetrahydrofuran is added dropwise to 5.93 g. of lithium aluminum hydride in 400 ml. of tetrahydrofuran. After the addition is completed, the solution is refluxed for six hours and then decomposed with 6 ml. of water, 8 ml. of 20 percent aqueous sodium hydroxide and 18 ml. of water. The reaction mixture is filtered, the filtrate is concentrated under reduced pressure and the residue is fractionated to yield the 3-aza-7-(methyl-aza)-bicyclo[3,3,1]nonane (or N-methyl-bispidin).

14 g. of 3-aza-7-(methyl-aza)-bicyclo[3,3,1]nonane is added to a benzene solution of 7.6 g. of chloroacetonitrile containing in suspension 10.6 g. of anhydrous sodium carbonate. The mixture is refluxed for six hours, is filtered hot, and the filtrate is concentrated under reduced pressure to yield the desired {3-aza-7-(methyl-aza)-3-bicyclo[3,3,1]nonyl}-acetonitrile (or [7-methyl-3-bispidinyl]-acetonitrile).

17.9 g. of {3-aza-7-(methyl-aza)-3-bicyclo[3,3,1]nonyl}-acetonitrile in 100 ml. of tetrahydrofuran is added to 5.7 g. of lithium aluminum hydride in 400 ml. of tetrahydrofuran. The reaction mixture is refluxed for six hours, then decomposed with 6 ml. of water, 8 ml. of 20 percent aqueous sodium hydroxide and 18 ml. of water. The insoluble material is filtered off, the filtrate is concentrated and fractionated to yield the desired 2-{3-aza-7-(methyl-aza) - 3 - bicyclo[3,3,1]nonyl}-ethylamine (or 2-[7-methyl-3-bispidinyl]-ethylamine).

The 3,7-diaza-bicyclo[3,3,1]nonane, when reacted with benzyl bromide, yields the desired 3-aza-7-(benzyl-aza)-bicyclo[3,3,1]nonane. The latter is reacted with chloroacetonitrile and the resulting {3-aza-7-(benzyl-aza)-3-bicyclo[3,3,1]nonyl}-acetonitrile is reduced with lithium aluminum hydride to yield the corresponding ethylamine. The 2-{3-aza-7 - (benzyl-aza) - 3-bicyclo[3,3,1]nonyl}-ethylamine is treated with S-methyl-isothiourea sulfate to yield the desired 2-{3 - aza-7-(benyl-aza)-3-bicyclo[3,3,1]nonyl}-ethyl-guanidine sulfate (or 2-(7-benzyl-3-bispidinyl)-ethyl-guanidine sulfate). The above reactions are carried out according to the procedure given in the Example 4.

What is claimed is:

1. A member selected from the group consisting of an (N,N-aza-bicycloalkylene-imino)-lower alkyl-guanidine compound of the formula

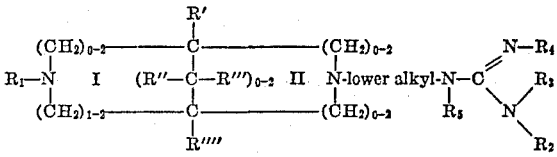

in which each of the radicals of R', R", R''' and R'''' stands for a member selected from the group consisting of hydrogen and methyl, $R_1$ is a member selected from the group consisting of lower alkyl and phenyl-lower alkyl, each of the radicals $R_2$ and $R_4$ is a member selected from the group consisting of hydrogen, lower alkyl and lower alkanoyl, and each of the groups $R_3$ and $R_5$ is a member selected from the group consisting of hydrogen and lower alkyl, with the proviso that at least one of the radicals $R_2$, $R_3$ and $R_4$ stands for hydrogen, and in which the bicycloalkylene portion of the N,N-aza- bicycloalkylene-imino group has a total of four to ten carbon atoms, both inclusive, as ring and bridge members, with the proviso that when ring I has four ring members, ring II has at least four ring members, and the pharmaceutically acceptable acid addition salts thereof.

2. 2-{3-aza - 7-(methyl-aza)-3 - bicyclo[3,3,1]nonyl}-ethyl-guanidine.

No references cited.